United States Patent Office 2,898,315
Patented Aug. 4, 1959

2,898,315

ADHESIVE COMPOSITION

David R. Smith and Robert L. Hall, McGregor, Tex., assignors to Phillips Petroleum Company, a corporation of Delaware No Drawing. Application May 6, 1955
Serial No. 506,658

13 Claims. (Cl. 260—27)

This invention relates to a new adhesive composition. More specifically this invention relates to a cementing or adhesive composition comprising a copolymer of a conjugated diene with a heterocyclic nitrogen containing monomer and an alkyd resin.

Many cementing and adhesive compositions have been suggested in the literature for bonding materials such as rubbers, wood, metals, ceramics, glass, plastics, paper, fabrics and the like to each other or other materials such as in the preparation of laminates and the like. Of considerable importance among these compositions are polymers of various polymerizable compositions. These materials can be vulcanized or quaternized to form a set or cured bond or they can be applied to fabrics, papers or other flexible strips to form adhesive tapes. The majority of such compositions developed by the prior art leave much to be desired particularly in relation to bonding strength.

We have now found that an adhesive composition capable of forming high bonding strengths can be prepared from a low Mooney copolymer of a conjugated diene and a heterocyclic nitrogen containing monomer using an alkyd resin prepared by esterifying a monocarboxylic or polycarboxylic acid with a polyhydric alcohol as a tackifier and incorporating an epoxy compound in the composition. The adhesive when used as a cement bond has good strengths throughout the temperature range of −70 to 175° F.

An object of this invention is to prepare a high bonding strength adhesive.

Another object of this invention is to provide a method of bonding solids one to the other.

Still other objects and advantages of this invention will be apparent to those skilled in the art having been given this disclosure.

According to this invention an epoxy compound is incorporated into a composition comprising a (1) copolymer of a conjugated diene and a heterocyclic nitrogen containing monomer and (2) an esterification product of a carboxylic acid and a polyhydric alcohol as a tackifier.

In a preferred embodiment of this invention, a solution is prepared of a copolymer formed by copolymerizing a monomeric mixture comprising at least 50 parts by weight of a conjugated diene and at least 5 parts by weight of a heterocyclic nitrogen containing monomer, all parts being based on parts per hundred parts of total monomers, and 20 to 100 parts of the esterification product of a mono- or polycarboxylic acid and a polyhydric alcohol per 100 parts of copolymer and having 2 to 15 parts epoxy compound per 100 parts monomer plus resin in the composition. The composition can be spread on the article but is preferably first put into the solution and applied by spraying, brushing or by other means onto the article to be made adhesive. When high bonding strength cements are desired, vulcanization compounds or quaternization compounds are incorporated in the solution and the adhesive, after being applied, is cured by heat.

The term "copolymer" as used herein is broad and includes the polymerized product resulting from copolymerizing two or more copolymerizable monomers. These copolymers can be prepared by any method known in the art for preparing such copolymers such as mass or emulsion polymerization. The monomeric charge is comprised of at least 50 weight parts conjugated diene and at least 5 weight parts of a heterocyclic nitrogen containing monomer. Other copolymerizable monomers can be used along with the foregoing monomeric materials. Sufficient modifier will be used in the polymerization recipe of the conjugated diene and the heterocyclic nitrogen containing monomer to produce a copolymer having a ML-4 Mooney value in the range of 5 to 50 and preferably in the range of 10 to 20.

It will be understood by those skilled in the art that properties of the adhesive can be varied by the proper selection of proportions of monomers and by the use of vulcanizing or quaternizing agents. For example, copolymers prepared from at least 70 parts of conjugated diene and not more than 15 parts heterocyclic nitrogen containing monomer per 100 parts total monomers will be soft and flexible when vulcanized while such copolymers will be more resinous when quaternized. In the absence of vulcanization or quaternization agents the adhesive will remain tacky but if such agents are used the adhesive will cure to form a firm, tough bond. These polymeric materials can contain a reinforcing agent or other filler such as carbon black or they can be free of such materials, that is, a reinforcing agent can be incorporated in the polymerization step.

The conjugated dienes useful in this invention generally contain 4 to 6 carbon atoms per molecule but those containing more carbon atoms per molecule, e.g., 12, can be used. Furthermore, various alkoxy, such as methoxy and ethoxy and cyano derivatives of these conjugated dienes are applicable. Examples of the preferred conjugated dienes include: 1,3-butadiene, 2,3-dimethyl-1,3-butadiene, 2-phenyl-3-ethyl-1,3-butadiene, 2,3-dipropyl-1,3-butadiene, isoprene, piperylene, 3-furyl-1,3-butadiene, 2-methoxy-1,3-butadiene, chloroprene, bromoprene, methylchloroprene, and the like.

The heterocyclic nitrogen containing monomers suitable for forming the copolymer useful in this invention are preferably those having the structure

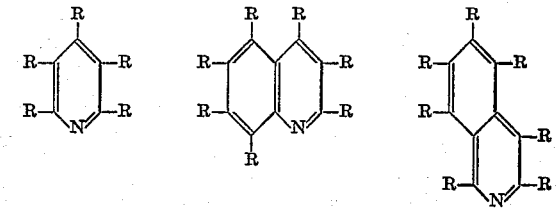

where R is selected from the group consisting of hydrogen, alkyl, vinyl, alpha-methylvinyl, nitro, alkoxy, haloalkyl, alkyl, aryl, hydroxyaryl, and the like; one of said groups being selected from the group consisting of vinyl, and alpha-methylvinyl. It is preferred in order to avoid stearic hindrance that the total number of carbon atoms in substituted groups be not greater than 12, and the monomer is preferably of the pyridine and quinoline series. Examples of such compounds are 2-vinylpyridine; 2-methyl-5-vinylpyridine; 2-vinyl-5-ethylpyridine; 2-vinyl-5-ethylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-5-vinylpyridine; 2,4-dimethyl-5,6-diphenyl-3-vinylpyridine; 2-decyl-5(alpha-methylvinyl)pyridine; 3-(alpha-methylvinyl)pyridine; 3-nitro-2-vinylpyridine; 2-vinyl-4-hydroxy-5-nitropyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 3-vinyl-5-phenylpyridine; 2-

(para-methylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propylquinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxy methylisoquinoline, etc.

In addition to the conjugated diene and the pyridine or quinoline, other copolymerizable monomers can be used. Monomers copolymerizable with the above monomers are those having a $CH_2=C<$ group and include aryl olefins, acrylic and substituted acrylic acids and their esters, vinyl ethers, vinyl ketones, unsaturated nitriles and unsaturated amides. Specific examples of such copolymerizable monomers include styrene, various alkyl styrenes, p-chlorostyrene, p-methoxy styrene, alpha-methylstyrene, vinylnaphthalene, acrylic acid, methacrylic acid, methacrylate, ethacrylate, methyl-alpha-chloroacrylate, methyl methacrylate, ethyl methacrylate, butyl methacrylate, methylethylacrylate, acrylonitrile, methacrylonitrile, methacrylamide, methylisopropenyl ketone, methyl vinyl ketone, methyl vinyl ether, vinyl acetate, vinyl chloride, vinylidene chloride, vinylfurane, vinylcarbazole, vinylacetylene and the like.

It will be understood by those skilled in the art that the conjugated diene and/or the heterocyclic nitrogen monomers can be a mixture of such monomers if so desired so long as the total amount of the conjugated diene and the total amount of heterocyclic nitrogen monomers fall within the range described.

The tackifiers used in this invention are esters of mono- or polycarboxylic acids esterified with a polyhydric alcohol. Examples of suitable polyhydric alcohols useful in the esterification reaction include ethylene glycol, propylene glycol, diethyl glycol, alpha-butylene glycol, beta-butylene glycol, tetramethylene glycol, triethylene glycol, hexamethylene glycol, diphenylpropane diol, glycerol, erythritol, pentaerythritol, ribitol, sorbitol, allitol, inositol, scyllitol, etc. Alcohols containing only one hydroxy group per molecule can be present during the esterification but these monohydroxy alcohols should generally not exceed about 5 weight percent of the total alcohols. Examples of such monohydroxy alcohols include methyl alcohol, ethyl alcohol, n-propyl alcohol, isopropyl alcohol, sec-butyl alcohol, tert-butyl alcohol, isoamyl alcohol, octyl alcohol, myristyl alcohol, benzyl alcohol, cyclohexanol, furfuryl alcohol, etc.

Examples of suitable carboxylic acids include rosin acids such as abietic and heat modified disproportionated rosin acids. Other suitable carboxylic acids include saturated and unsaturated monocarboxylic acids, dicarboxylic acids, tricarboxylic acids, aromatic mono- and polycarboxylic acids, etc. Of particular value are the rosin acids. Examples of other suitable acids include maleic, fumaric, itaconic, citraconic, mesaconic, ethylmaleic, methylethylmaleic, diethylmaleic, glutaconic, alpha-methyl-glutaconic, alpha-alpha'-dimethylglutaconic, beta-methylglutaconic, alpha-alpha-diethylglutaconic, alpha-beta-gamma-tributylglutaconic, 1,2-dihydromuconic, 2-octenedioic, 2-heptenedioic, 2-pentadecenedioic acids, etc. Modifying acids up to 25 percent of the total acids can be used. Examples of such modifying acids include: phthalic, terphthalic, mellitic, tricarballylic, formic, acetic, propionic, butyric, isobutyric, valeric, caprylic, paralyonic, capric, myristic, stearic, arachidic, oleic, arylic, ethacrylic, benzoic, toluic, salicylic acids etc. We particularly prefer the esterification product of a rosin or modified rosin and a polyhydric alcohol. Such resins (esterified products) are available from the Hercules Powder Company. Examples of such commercially available resins include Pentalyn A, Pentalyn C, Polypale ester 10, and Vinsol ester gum resins.

Pentalyns are a group of rosin esters comprised essentially of the esterification product of abietic acid and pentaerythritol. The complete esterification can be represented by the theoretical formula

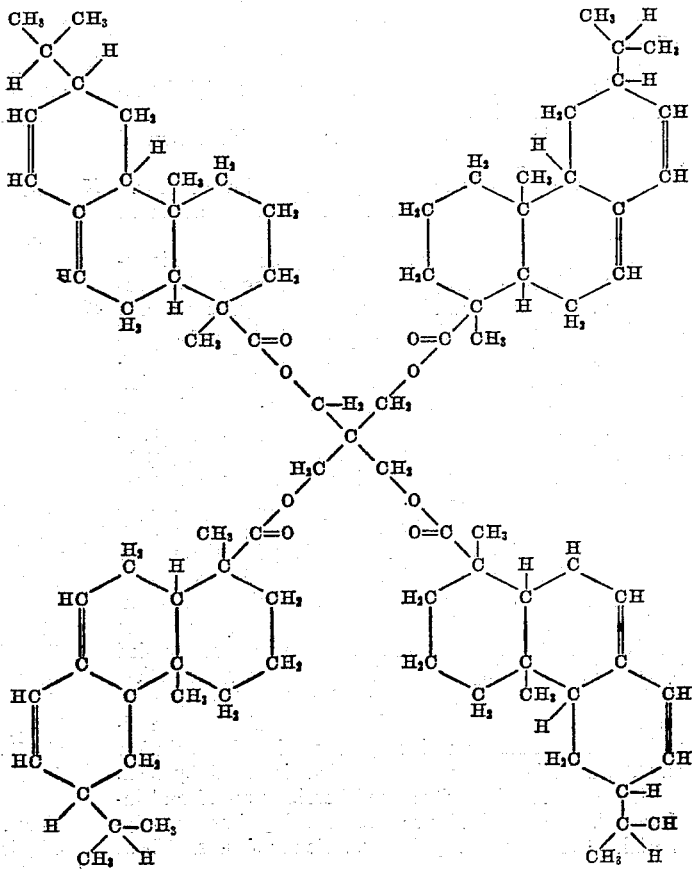

Pentalyn A has a melting point of 112 to 115° C., an acid number of 12 to 16 and a specific gravity of 1.08. Pentalyn C is the pentaerythritol ester of a modified rosin (condensed or partially polymerized) and has the following properties: melting point of 136°, acid number of 15, and a specific gravity of 1.09.

Poly-pale 10 is the esterification product of glycerol and partially polymerized rosin and has a melting point of 113° C., an acid number of 6 and a specific gravity of 1.085.

Vinsol ester gum is an ester made by esterifying Vinsol resin with glycerol. Vinsol resin is the residue left after extracting rosin with petroleum solvents. The Vinsol resin has a melting point of approximately 115° C., whereas the Vinsol ester gum has a melting point in the range 144–148° C.

In all of these compositions an epoxy compound is used. It is believed that the epoxy compound promotes cross linking of the resin and thereby increases the bonding strength. We are not limited to this theory but we have found that when such an epoxy compound is present, the adhesive composition forms a firmer bond than such compositions in the absence of the epoxy compound. We prefer to use 2–15 parts epoxy compound per 100 parts polymer plus resin having found that such a ratio gives satisfactory results. Typical epoxy compounds include: 1,2-epoxy-2,4,4-trimethylpentane; 1,2-epoxy cyclohexane, 1,2-epoxy cyclooctane; 1,2-epoxy-4-cyclohexylpentane; 1,2-epoxy octadecane; 1,2-epoxy eicosane; styrene oxide; 1,2-epoxy-3-chlorophenyl propane; 2,3-epoxy-5-ethoxy decane; 1,2-epoxy-4-chloromethyl hexadecane; 1,2-epoxy-4-chlorocyclohexane; epichlorohydrin; 1,2-epoxy-4-(2-hydroxyethyl) tridecane; and 5,6-epoxy-14-hydroxy-18-chloro-22-ethyl triacontane.

As have been indicated when a cementing bond is desired, vulcanizing agents and/or quaternizing agents are employed. Whenever the composition is to be vulcanized, a vulcanization catalyst, a vulcanization accelerator and an anti-oxidant are generally used.

Vulcanization agents are well known in the art. Examples of such agents include: sulfur, p,p'-dibenzoylquinone dioxime, p-quinone hydroxide, magnesium oxide, sulfur dichloride, sulfur monochloride, alkyl phenol monosulfide, alkyl phenol disulfide, etc. The sulfur containing materials are generally preferred.

There are also many known accelerator-activators in the art. Examples of such compounds include: lead oxide, zinc oxide, magnesium oxide, lead carbonate, dehydrated lime, lead silicate, dibutyl ammonium oleate, oleic acid, dibenzyl amine, linseed oil, fatty acids, rosin acids, triethanolamine, zinc stearate, etc.

Among those compounds known in the art to be accelerators can be mentioned 2-mercaptodiazoline, formaldehyde, para-toluene, mixed diaryl guanidine, piperidinum, pentamethylene, dithiocarbamates, benzothiazyl disulfide, zinc dibenzyl dithiocarbamate, zinc dibutyl dithiocarbamate, zinc diethyl dithiocarbamate, 2-mercapto benzothiazole, dibutyl xanthogen disulfide, diphenylguanidine, tetraethyltheruam disulfide and many others.

Many anti-oxidants which are also known in the art include: hydroquinone, monobenzyl ether, phenyl-beta-methylamine, polymerized trimethyl dihydroquinone, heptylated diphenylamine, glycerol, monoester of salicylic acid, hexylchloromethylene, polydiaryl amine, hydrocarbon waxes, etc.

In general the amount of quaternizing agent, vulcanizing agent, activator-accelerator and anti-oxidant is small being the the range of .1 to 5 weight parts per 100 parts of polymer. However, lower or greater amounts can be used as is well understood in the art.

Quaternizing agents or mixtures thereof can be used, such agents being known to the art. Such materials are numerous and include the various alkyl halides such as methyl iodide, methyl bromide, ethyl iodide, propyl iodide, hexyl iodide, nonyl bromide, cetyl bromide; the various alkylene halides such as ethylene iodide, ethylene bromide, propylene chloride, butene bromide, octene bromide; the various substituted alkanes and cycloalkanes necessarily including the above alkyl and alkalene halides, which contain at least one hydrogen atom attached to a carbon atom, such as bromoform, chloroform, 1,2-dichloropropane, 1,2-dibromobutane, ethylene chlorohydrin, acetyl chloride, iodoform, chloroacetyl chloride; alkyl sulfates such as methyl sulfate, ethyl sulfate; various substituted aromatic compounds such as picryl chloride, benzoyl chloride, phenyl chloride, benzene sulfonyl chloride, benzyl chloride, benzal chloride, benzotrichloride, methyl benzene sulfonate; and polyhalogenated cycloalkanes such as hexachlorocyclopentadiene and the like.

It is understood that none of the typical compounds as shown above as being useful is intended to be complete but are merely intended to illustrate the wide variation of materials which are known by the art to perform the particular function. In using the adhesive composition, it is first put into solution. Any solvent which dissolves the copolymer can be used. The solvents are organic in nature and are preferably hydrocarbon. Solvents which are particularly preferred are aromatic hydrocarbons such as benzene, toluene, xylene, and the like but aliphatic hydrocarbon solvents such as petroleum ether, kerosene, hexane, cyclohexane, etc. are frequently employed. Other solvents which can be used are halogenated aliphatic compounds such as carbon tetrachloride, chloroform, methylene chloride, etc. Nitro paraffins such as nitromethane and nitroethane, as well as various ethers, can also be used. The amount of solvent used is dependent upon the concentration of the adhesive solution desired. Adhesive solutions varying in concentration from 5 to 50 percent by weight based on copolymer plus tackifier in the solvent are generally preferred, the upper limit being governed by the ability of the solvent to dissolve the copolymer and tackifier. To illustrate how this solution can be prepared, the following typical formulae are given.

A

| Ingredient: | Parts by weight |
|---|---|
| Butadiene/MVP (95/5) [1] | 100 |
| Epichlorohydrin | 5 |
| Pentalyn A [2] | 20 |
| Benzene | 150 |

B

| Ingredient: | Parts by weight |
|---|---|
| Butadiene/MVP (70/30) [1] | 100 |
| Epichlorohydrin | 10 |
| Benzoyl chloride | 0.5 |
| Poly-pale [2] | 50 |
| Kerosene | 450 |

C

Part X

| Ingredient: | Parts by weight |
|---|---|
| Butadiene/MVP (90/10) [1] | 100 |
| Philblack A [3] | 20 |
| Epichlorohydrin | 8 |
| Zinc oxide | 3 |
| Sulfur | 1.5 |
| Pentalyn C [2] | 33 |
| Toluene | 780 |

Part Y

| Ingredient: | Parts by weight |
|---|---|
| Butyl Eight [4] | 100 |
| Toluene | 100 |

[1] A copolymer prepared by copolymerizing the indicated parts by weight of 1,3-butadiene with the indicated parts by weight of 2-methyl-5-vinylpyridine. The numbers in parenthesis being the indicated parts by weight.
[2] An ester as has been defined in the specification.
[3] A carbon black.
[4] A dithiocarbamate-type rubber accelerator.

While the ingredients can be put into solution in any order, it is frequently preferred to mill the rubber compounding ingredients such as vulcanization agent, activator, activator-accelerator, filler, quaternization agent, etc. and to dissolve the milled material in a portion of the solvent. The tackifier resin is then dissolved in the remainder of the solvent and the two solutions mixed. It is, of course, within the scope of this invention to prepare only one solution.

Where it is desirable to store the material for long periods of time or where the solution is subject to warm temperature, it is frequently preferred to prepare two separate solutions especially where vulcanizing agents are present. This is illustrated by Formula C above. In that formula, the butadiene/MVP copolymer is milled with the carbon black, epichlorohydrin, zinc oxide and sulfur until the solids are completely incorporated in the rubber. The milled rubber is then put into solution in about 750 parts toluene. The Pentalyn C is then put into solution with the remaining solvent (about 30 parts) and the two solutions mixed. Butyl Eight is dissolved in an equal weight of toluene to form a 50% solution. While the two Parts X and Y can be mixed immediately, it is preferred to keep in separate solutions until used. Just before using sufficient Part Y is mixed with Part X to give two to three parts Butyl Eight per hundred parts copolymer.

The above solutions can be applied by brushing or spraying. In those compositions containing a quaternizing agent (B above) or vulcanizing agents (C above) the composition is cured to a firm set (cemented) by the application of heat. In general a temperature in the range of 125 to 200° F. is used, however, a temperature in the range of 80 to 400° F. can be used. The application of pressure to parts being cemented during the heat curing step will aid in forming the bond.

To further illustrate this invention, a composition of this invention was prepared as follows:

PART A

| Ingredients | Parts | Procedure |
| --- | --- | --- |
| Butadiene-MVP (90/10) Copolymer | 100 | Mix thoroughly on rubber mill and dissolve in benzene to a 15 percent rubber solution. |
| Carbon black (Philblack A) | 20 | |
| Epichlorohydrin | 8 | |
| Zinc Oxide | 3 | |
| Sulfur | 1.5 | |
| Pentalyn A resin | 33 | Cold cut resin into benzene and mix resin solution into rubber solution (above). |
| Benzene | 33 | |

PART B

Butyl Eight benzene—Mix to some known concentration say 50 percent and just before using mix enough Part B to Part A to give 2 to 3 parts Butyl Eight per 100 parts copolymer.

Dummy propellant rods were prepared from steel. After Part B and Part A were mixed, the steel rod was covered with the mixture by brushing. Cloth tape was similarly coated and wrapped around the rod and the adhesive cured at 175° F. for 15 hours.

Similarly, 27 adhesives (from 15 suppliers) which are used commercially for wrapping propellants were treated in the same manner and qualitatively compared to the above adhesive by stripping the cloth from the rod at −70 and +175° F. The composition of this invention was equal to or superior to all of the material tested. The following materials were the best of the commercial adhesives compared.

| Material | Supplier | Probable Composition |
| --- | --- | --- |
| EC-776 | Minnesota Mining & Mfg. Co. | Synthetic rubber in organic solvent. |
| Bostek 1075 | B. B. Chemical Co. | Do. |
| Loxite 7003 | Xylos Rubber Co. | Do. |
| SWC-1692-3 | Angier Products Co. | Do. |
| SWK-72-23 | do. | Do. |

We claim:
1. An adhesive composition comprising a copolymer of at least 50 weight parts of a conjugated diene and of at least 5 weight parts of a heterocyclic nitrogen containing monomer containing solely carbon and nitrogen in the heterocyclic ring, said weight parts being based on 100 parts total monomeric material, an esterification product of a carboxylic acid selected from the group consisting of saturated and unsaturated carboxylic acids derived from aliphatic hydrocarbons by replacing at least one of the hydrogen atoms with a COOH group and a polyhydric alcohol selected from the group consisting of alcohols derived from hydrocarbons by replacing at least two hydrogen atoms with OH groups, and an epoxy compound selected from the group consisting of monoepoxides of hydrocarbons and halogen substituted hydrocarbons.

2. An adhesive composition comprising a copolymer of at least 50 weight parts of a conjugated diene and at least 5 weight parts of a heterocyclic nitrogen containing monomer containing solely carbon and nitrogen in the heterocyclic ring per 100 parts total monomeric material, 20 to 100 weight parts of the esterification product of a carboxylic acid selected from the group consisting of saturated and unsaturated carboxylic acids derived from aliphatic hydrocarbons by replacing at least one of the hydrogen atoms with a COOH group and a polyhydric alcohol selected from the group consisting of alcohols derived from hydrocarbons by replacing at least two hydrogen atoms with OH groups per 100 parts of copolymer, and 2 to 15 weight parts of an epoxy compound selected from the group consisting of monoepoxides of hydrocarbons and halogen substituted hydrocarbons per 100 parts copolymer plus esterification product.

3. An adhesive composition comprising a copolymer of at least 50 weight parts of a conjugated diene containing 4 to 12 carbon atoms per molecule and at least 5 weight parts of a heterocyclic nitrogen containing monomer selected from the group consisting of a monovinyl pyridine, monovinyl quinoline, alpha-methylvinyl pyridine, alpha-methylvinyl quinoline per 100 parts of total monomeric material and having an ML-4 Mooney value in the range of 5 to 50, 20 to 100 weight parts of an alkyd resin prepared by esterifying a polyhydric alcohol selected from the group consisting of alcohols derived from hydrocarbons by replacing at least two hydrogen atoms with OH groups with a carboxylic acid selected from the group consisting of saturated and unsaturated carboxylic acids derived from aliphatic hydrocarbons by replacing at least one of the hydrogen atoms with a COOH group per 100 parts of said copolymer and 2 to 15 weight parts of an epoxy compound selected from the group consisting of mono-epoxides of hydrocarbons and halogen substituted hydrocarbons based on copolymer plus resin.

4. An adhesive composition comprising an organic solution having a concentration in the range of 5 to 50 weight percent of a copolymer of at least 50 weight parts of a conjugated diene and at least 5 weight parts of a heterocyclic nitrogen monomer selected from the group consisting of vinylpyridines and vinylquinolines, 20 to 100 weight parts of the esterification product of a carboxylic acid selected from the group consisting of saturated and unsaturated carboxylic acids derived from aliphatic hydrocarbons by replacing at least one of the hydrogen atoms with a COOH group and a polyhydric alcohol selected from the group consisting of alcohols derived from hydrocarbons by replacing at least two hydrogen atoms with OH groups per 100 parts of copolymer and 2 to 15 weight parts of an epoxy compound selected from the group consisting of mono-epoxides of hydrocarbons and halogen substituted hydrocarbons per 100 parts copolymer and esterification product.

5. An adhesive composition prepared by dissolving in an organic solvent to a weight concentration in the range of 5 to 50 percent a composition comprising (A) a copolymer prepared by copolymerizing at least 50 weight parts of a conjugated diene containing 4 to 6 carbon atoms per molecule and at least 5 weight parts of a heterocyclic nitrogen containing monomer selected from the group consisting of vinyl- and alpha-methylvinyl pyridine and quinolines, parts being per 100 parts of total monomeric material, (B) 20 to 100 weight parts per 100 parts of the copolymer of A of an alkyd resin prepared by esterifying a polyhydric alcohol selected from the group consisting of alcohols derived from hydrocarbons by replacing at least two hydrogen atoms with OH groups with an acid selected from the group consisting of mono- and di-carboxylic acids wherein said acids are derived from aliphatic hydrocarbons by replacing hydrogen atoms with COOH groups and (C) 2 to 15 weight parts based on 100 weight parts of A plus B of an epoxy compound selected from the group consisting of mono-epoxides of hydrocarbons and halogen substituted hydrocarbons.

6. The composition of claim 5 wherein the organic solvent is a hydrocarbon.

7. The composition of claim 6 wherein the organic solvent is an aromatic hydrocarbon.

8. The composition of claim 7 wherein the solvent is benzene, the copolymer is a copolymer of 1,3-butadiene and 2-methyl-5-vinylpyridine, and the carboxylic acid is selected from the group consisting of rosin and heat modified disportionated rosin.

9. A method of bonding articles one to the other said method comprising applying to at least one of said articles a 5 to 50 weight percent solution of a composition comprising (A) 100 weight parts of a copolymer of a conjugated diene and a heterocyclic nitrogen containing monomer containing solely carbon and nitrogen in the heterocyclic ring, (B) 20 to 100 weight parts of an alkyd resin consisting of the esterification product of a polyhydric alcohol selected from the group consisting of alcohols derived from hydrocarbons by replacing at least two hydrogen atoms with OH groups and carboxylic acid selected from the group consisting of saturated and unsaturated carboxylic acids derived from aliphatic hydrocarbons by replacing at least one of the hydrogen atoms with a COOH group and (C) 2 to 15 weight parts based on 100 weight parts of A+B of an epoxy compound selected from the group consisting of mono-epoxides of hydrocarbons and halogen substituted hydrocarbons and bringing the article having said solution applied thereto adjacent the article to which it is to be bonded.

10. A method of bonding articles one to the other which comprises applying to at least one of said articles a 5 to 50 weight percent hydrocarbon solution of a composition comprising (A) 100 weight parts to polymerized product having an ML-4 Mooney value in the range of 5 to 50 weight parts, based on 100 parts total monomer, of a conjugated diene having 4 to 6 carbon atoms per molecule and at least 5 weight parts, based on 100 parts total monomers, of a heterocyclic monomer selected from the group consisting of monovinyl and mono-alpha-methylvinylpyridine and quinolines, (B) 20 to 100 weight parts of an alkyd resin consisting of the esterification product of a polyhydric alcohol selected from the group consisting of alcohols derived from hydrocarbons by replacing at least two hydrogen atoms with OH groups and an acid selected from the group consisting of mono-carboxylic acids and poly-carboxylic acids wherein said acids are derived from aliphatic hydrocarbons by replacing hydrogen atoms with COOH groups and (C) 2 to 15 weight parts based on 100 parts of copolymer plus resin of an epoxy compound selected from the group consisting of mono-epoxides of hydrocarbons and halogen substituted hydrocarbons and bringing the article having said solution applied thereto adjacent the article to which it is to be bonded.

11. The method of claim 10 wherein the composition is vulcanized while in the adjacent position.

12. The method of claim 10 wherein the composition is quaternized while in the adjacent position.

13. A method of bonding articles one to the other which comprises preparing a 5 to 50 weight percent solution of an adhesive composition in an aromatic hydrocarbon solvent said solution being prepared by first milling into 100 weight parts a copolymer prepared by copolymerizing at least 50 weight parts per 100 parts of total monomers 1,3-butadiene and at least 5 weight parts per 100 weight parts total monomers 2-methyl-5-vinylpyridine (A) 20 to 100 weight parts of an alkyd resin prepared by esterifying a polyhydric alcohol selected from the group consisting of alcohols derived from hydrocarbons by replacing at least two hydrogen atoms with OH groups with a rosin acid, (B) a vulcanization agent, (C) a vulcanization activator, (D) 2 to 15 parts per 100 parts copolymer plus alkyd resin of an epoxy compound selected from the group consisting of mono-epoxides of hydrocarbons and halogen substituted hydrocarbons, dissolving the resulting composition into a portion of said aromatic hydrocarbon solvent, incorporating 2 to 3 parts of a vulcanization accelerator into the remainder of said solvent, mixing the two resulting solutions, applying the resulting mixed solution to at least one of said articles to be bonded, pressing the article having solution so applied against a second article, and heating the articles while being so pressed at a temperature in the range of 0 to 400° F. until the composition is vulcanized.

No references cited.